US007643085B2

(12) United States Patent
Saiki et al.

(10) Patent No.: US 7,643,085 B2
(45) Date of Patent: Jan. 5, 2010

(54) IMAGE PICKUP APPARATUS AND METHOD OF MANUFACTURING THEREOF

(75) Inventors: Jun Saiki, Osaka (JP); Miyuki Nagashima, Osaka (JP)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 11/677,732

(22) Filed: Feb. 22, 2007

(65) Prior Publication Data

US 2007/0200941 A1 Aug. 30, 2007

(30) Foreign Application Priority Data

Feb. 24, 2006 (JP) .............................. 2006-048836

(51) Int. Cl.
*H04N 5/225* (2006.01)
*G03B 17/02* (2006.01)

(52) U.S. Cl. ...................... 348/373; 348/376; 348/374; 348/375; 396/535

(58) Field of Classification Search ................ 348/373, 348/374, 375, 376; 396/535
See application file for complete search history.

(56) References Cited

U.S. PATENT DOCUMENTS

| 6,181,380 | B1 * | 1/2001 | Toyofuku et al. ............ 348/373 |
| 7,436,453 | B2 * | 10/2008 | Takahashi .................... 348/374 |
| 7,505,072 | B2 * | 3/2009 | Saitoh ..................... 348/333.01 |
| 7,505,079 | B2 * | 3/2009 | Ariga .......................... 348/374 |
| 2003/0151691 | A1 * | 8/2003 | Tokano ....................... 348/375 |
| 2004/0223079 | A1 * | 11/2004 | Shibayama ................. 348/375 |
| 2005/0030419 | A1 * | 2/2005 | Kikuchi ...................... 348/375 |
| 2005/0030420 | A1 * | 2/2005 | Ogami ........................ 348/375 |

FOREIGN PATENT DOCUMENTS

JP 2004-260704 9/2004

* cited by examiner

*Primary Examiner*—Nhan T Tran
*Assistant Examiner*—Quang V Le
(74) *Attorney, Agent, or Firm*—Hamre, Schumann, Mueller & Larson, P.C.

(57) ABSTRACT

An image pickup apparatus of the present invention is a portion of the image pickup portion is exposed on a first surface of the casing. The apparatus includes: a holding frame disposed on a second surface, which is the rear surface of the first surface of the casing, wherein the image pickup portion is held by the holding frame, and the holding frame is fixed to a third surface adjacent to the second surface. With this configuration, it is possible to reduce the number of components, and to eliminate the need for the step of attaching the double-faced tape, and the step of attaching the cover ring to the front panel.

8 Claims, 18 Drawing Sheets

IMAGE PICKUP APPARATUS AND METHOD OF MANUFACTURING THEREOF

BACKGROUND OF THE INVENTION

1. Field of the Invention

The present invention relates to an image pickup apparatus, such as a digital still camera. The invention also relates to a method for assembling such an image pickup apparatus.

2. Description of Related Art

Recently, a higher resolution, as well as size and weight reduction has been achieved for image pickup apparatuses such as a digital still camera.

FIG. 14 is a perspective view showing the external appearance of a conventional image pickup apparatus.

As shown in FIG. 14, the conventional image pickup apparatus 100 contains an image pickup portion 105 containing a lens, an image pickup element and so on and being partially exposed outside. A trim ring 101 is disposed around the image pickup portion 105. The image pickup portion 105 is fixed to a front panel of the image pickup apparatus 100 with a plurality of screws 106 (see FIG. 13).

FIG. 15 is an exploded perspective view showing the configuration of the trim ring 101. As shown in FIG. 15, the trim ring 101 is made up of a cover ring 102 made of metal, a double-faced tape 103 and a holding ring 104 made of a resin. The trim ring 101 is completed by attaching the cover ring 102 to the holding ring 104 with the double-faced tape 103 in this configuration. Additionally, a plurality of engaging claws 108 are arranged on the rear surface of the surface of the holding ring 104 onto which the double-faced tape 103 is attached.

When fixing the trim ring 101 to the image pickup apparatus 100, the engaging claws 108 (see FIG. 15) formed on the holding ring 104 are engaged with engaging holes formed in the image pickup apparatus 100, as shown in FIG. 13. Thus, the screws 106 can be concealed by the trim ring 101.

An image pickup apparatus as described above can be assembled in accordance with the flowchart shown in FIG. 16. First, an auxiliary light cover, which forms the outer enclosure of a light-emitting portion 109, is fixed to the inner surface of a front cover 122 with the double-faced tape (Step S11).

Next, the image pickup portion 105 is fixed temporarily to the inner surface side of the front cover 122, and then finally fixed from the surface side of the front cover 122 with the screws 106 (Step S12).

Next, a frame on which a circuit board and a battery unit and so on are mounted is fixed to the inner surface of the front cover 122 with screws (Step S13).

Next, a top cover 121 is fixed temporarily (Step S14), and a rear unit (not shown) is fixed temporarily (Step S15), and side covers 123 are fixed temporarily, and the whole structure is fixed with a screw 124 (Step S16).

Finally, the trim ring 101 is fixed to the front cover 122 (Step S17). Thus, the image pickup apparatus 100 is completed.

A configuration in which the image pickup portion is fixed with screws from the front surface side of the image pickup apparatus in the above-described manner is disclosed, for example, in FIG. 1 of JP 2004-260704A.

However, in the conventional configuration, the trim ring 101 is made up of the cover ring 102, the double-faced tape 103 and the holding ring 104, resulting in the problem of a large number of components and cost increase.

SUMMARY OF THE INVENTION

It is an object of the present invention to provide an image pickup apparatus that can be realized with a small number of components at low cost. It is another object of the invention to provide a method for assembling an image pickup apparatus that can be realized at low cost.

The present image pickup apparatus comprises: a casing; and an image pickup portion comprising a lens and an image pickup element, and contained in the casing, so that a portion of the image pickup portion is exposed from a first surface of a panel constituting the casing, wherein a holding frame is disposed on a second surface, which is the rear surface of the first surface of the panel, the holding frame being fixed to a third surface of the panel adjacent to the second surface, and the image pickup portion is held by the holding frame.

A method for assembling an image pickup apparatus according to the present invention is a method for assembling image pickup apparatus comprising: a casing; and an image pickup portion comprising a lens and an image pickup element, and contained in the casing, so that a portion of the image pickup portion is exposed from a first surface of a panel constituting the casing, wherein a holding frame is disposed on a second surface, which is the rear surface of the first surface of the panel, the holding frame being fixed to a third surface of the panel adjacent to the second surface, and the image pickup portion is held by the holding frame, the method including the steps of (A) preparing a front panel on which at least the image pickup portion is exposed, a rear panel disposed facing the front panel, and a top panel including a release switch, and fixing the top panel to the image pickup portion; (B) fixing the holding frame to the front panel; and (C) fixing the front panel and the rear panel assembled in step (B) to a unit assembled in step (A).

According to the present invention, it is possible to realize a low-cost image pickup apparatus with a small number of components.

DETAILED DESCRIPTION OF THE INVENTION

Embodiment 1

In the following description, a digital still camera is described as one example of the image pickup apparatus.

[1. Configuration of Image Pickup Apparatus]

Figure 1:
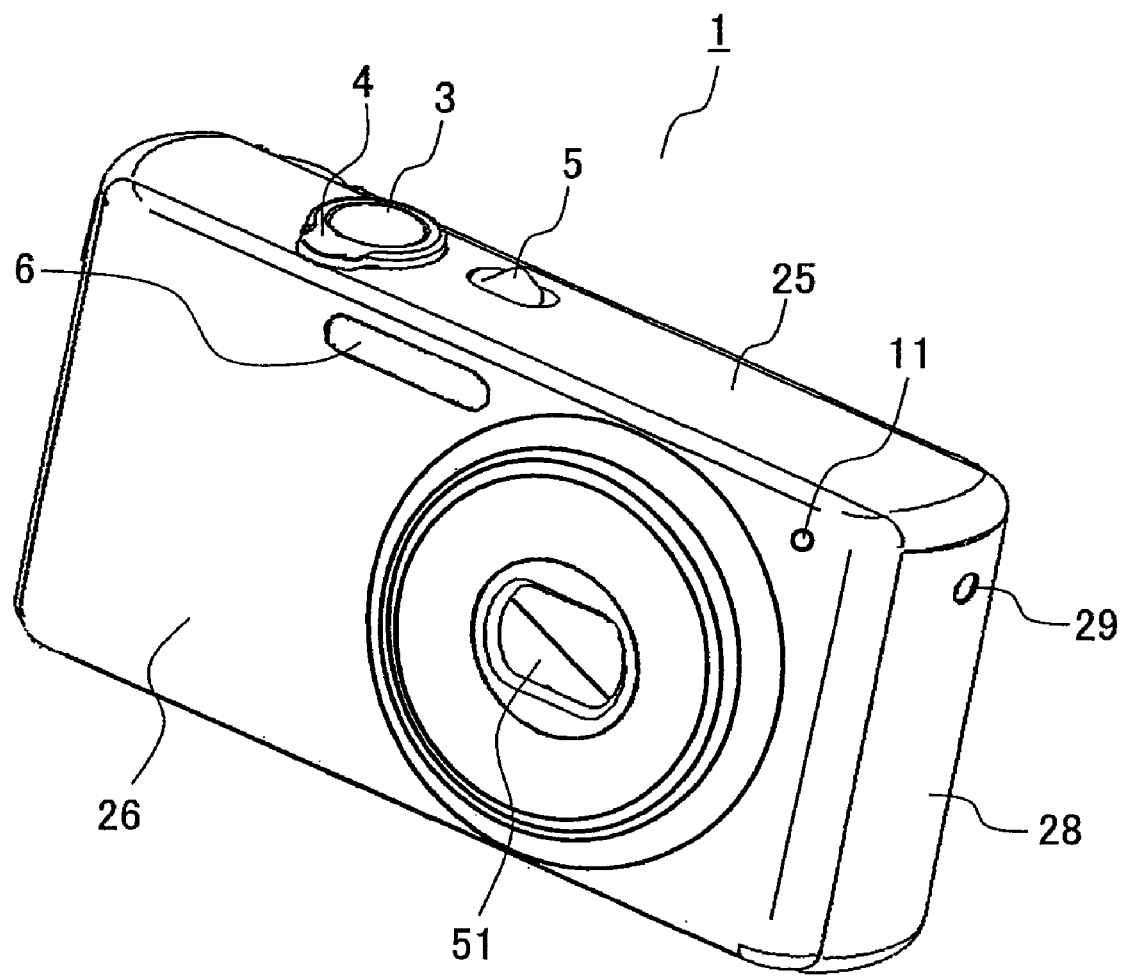
FIG. 1 is a perspective view showing the external appearance of an image pickup apparatus according to Embodiment 1.
Figure 2:
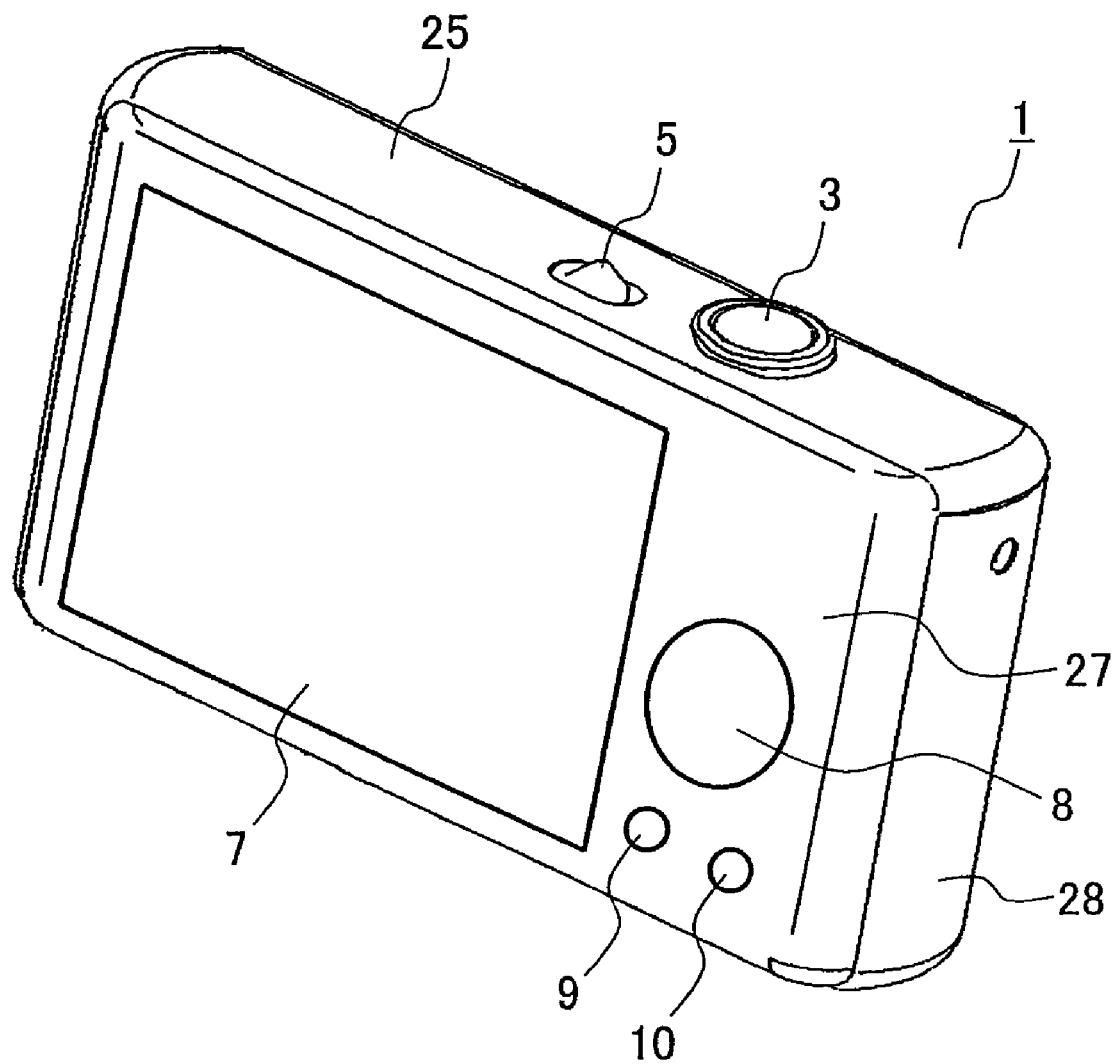
FIG. 2 is a perspective view showing the external appearance of the image pickup apparatus according to Embodiment 1.

FIGS. 1 and 2 are perspective views showing the external configuration of an image pickup apparatus. FIG. 1 shows the surface of the image pickup apparatus on which a lens is disposed (hereinafter, referred to as "front surface"). FIG. 2 shows the surface of the image pickup apparatus on which a display portion is mounted (hereinafter, referred to as "rear surface"). It should be noted that FIGS. 1 and 2 show a schematic representation, and a portion of the configuration is omitted for convenience.

As shown in FIGS. 1 and 2, the image pickup apparatus 1 includes an image pickup portion 51, a release switch 3, a zoom switch 4, a power switch 5, a flash lamp 6, a display portion 7, a cursor key 8, buttons 9 and 10 and a light-emitting portion 11. The image pickup portion 51, the flash lamp 6 and the light-emitting portion 11 are disposed on the front surface (the surface on the photographic subject side). The release switch 3, the zoom switch 4 and the power switch 5 are disposed on the top surface. The display portion 7, the cursor key 8 and the buttons 9 and 10 are disposed on the rear surface.

As shown in FIG. 1, the image pickup portion 51 contains, for example, a lens portion including a focus lens, a zoom lens or the like, and an image pickup element that captures an optical image entering through the lens portion and outputs an electric signal (video signal).

When pressed by a user, the release switch 3 allows an electric signal being picked up by the image pickup element to be captured as a video signal.

The zoom switch 4 is disposed substantially coaxially with respect to the release switch 3, and rotatably placed on the circumference of the release switch 3. By rotating the zoom switch 4, it is possible to move the zoom lens in the image pickup portion 51 towards the optical axis to scale up or down the optical image formed in the image pickup element. It should be noted that the zoom operation includes not only optical zoom in which the zoom lens is moved, but also electronic zoom in which a video signal is scaled up or down by signal processing.

The power switch 5 may be constituted by a slide switch, and can be operated to turn the power on when slid in one direction, and to turn the power off when slid in the opposite direction.

The flash lamp 6 can flash simultaneously with the operation of the release switch 3. The flashing of the flash lamp 6 can be switched between ON/OFF according to a given setting in the image pickup apparatus 1.

The light-emitting portion 11 contains a light-emitting diode, and lights up or flashes at the time of self-timer shooting, for example.

As shown in FIG. 2, the display portion 7 can display, for example, an image being captured (a so-called through image), a menu screen, and various kinds of information such as the remaining battery power, the current date and time, and the number of remaining shots. Although the display portion 7 is constituted by a liquid crystal panel in this embodiment, it may be constituted by an organic electroluminescence element or another display element. It should be noted that the method of fixing the display portion 7 to the image pickup apparatus 1 will be described in detail later. The display portion 7 and the image pickup portion 51 are disposed on opposed side surfaces of the image pickup apparatus 1.

The cursor key 8 can be operated to provide upward, downward, leftward and rightward indications, and a predetermined function is assigned to each of the upward, downward, leftward and rightward operating portions. Examples of the assigned functions include ON/OFF switching of flashing of the flash lamp 6, ON/OFF switching of a self-timer function, and setting of bracket shooting. When a menu screen is displayed on the display portion 7, the cursor key 8 also can be operated to move a cursor displayed on the screen in a desired direction.

The buttons 9 and 10 allow, for example, switching between ON/OFF of display of the above-described various kinds of information displayed on the display portion 7, or they may be assigned various other functions. Although two buttons 9 and 10 are provided in this embodiment, the number of the buttons 9 and 10 is not limited to this.

The image pickup apparatus 1 is enclosed with a top cover 25, a front cover 26, a rear cover 27 and side covers 28. Additionally, the front cover 26 also covers a portion of the bottom surface of the image pickup apparatus 1. The surface of the front cover 26 on which the image pickup portion 51 is exposed is defined as "first surface", the rear surface of the first surface is defined as "second surface", the bottom surface of a rib 36 (see FIG. 3A) is defined as "third surface", and the surface of the rib 36 (the rear surface of the third surface) is defined as "fourth surface".

The general outline of the assembly of the various covers is as follows. A top unit 70 is attached to the top surface of a camera unit 50, the front cover 26 is attached to the front surface of the camera unit 50, the rear cover 27 is attached to the rear surface of the camera unit 50, and the side covers 28 are attached to the left and right side surfaces of the camera unit 50. During assembly, the top cover 25, the front cover 26 and the side covers 28 are fastened together with a screw 29 and fixed.

[2. Internal Structure of Image Pickup Apparatus 1]

[2-1. Configuration of Front Unit 20]

A front unit 20 includes a front panel 30 made of metal such as aluminum, a holding frame 40 made of a resin, and an auxiliary light cover 60 made of a transparent resin. The various components constituting the front unit 20 are described below.

Figure 3A:
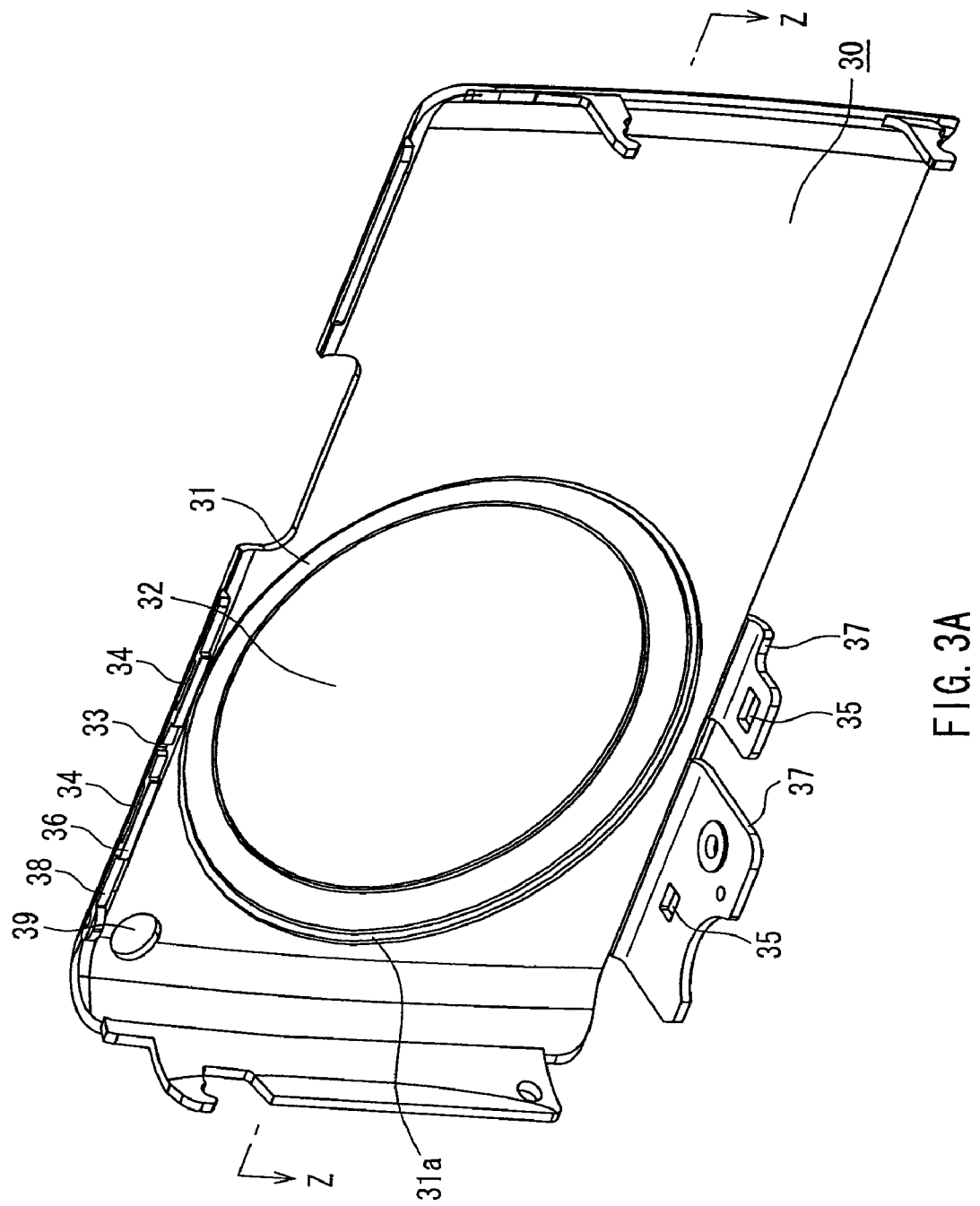
FIG. 3A is a perspective view showing the front panel.
Figure 3B:
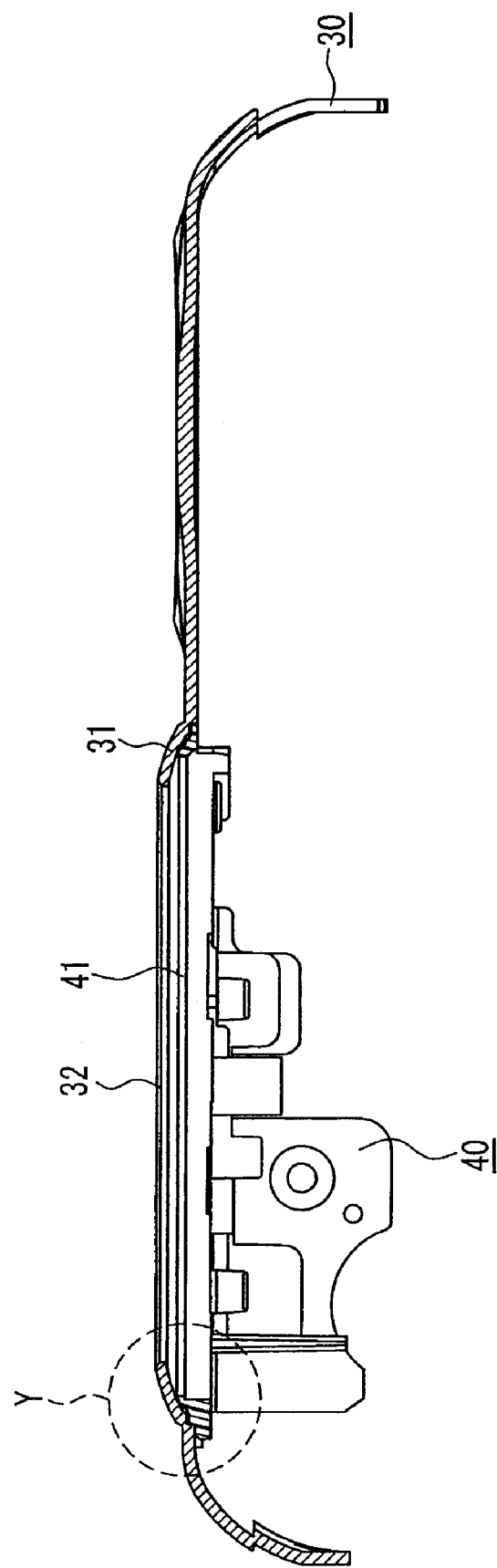
FIG. 3B is a cross-sectional view showing the front panel.
Figure 3C:
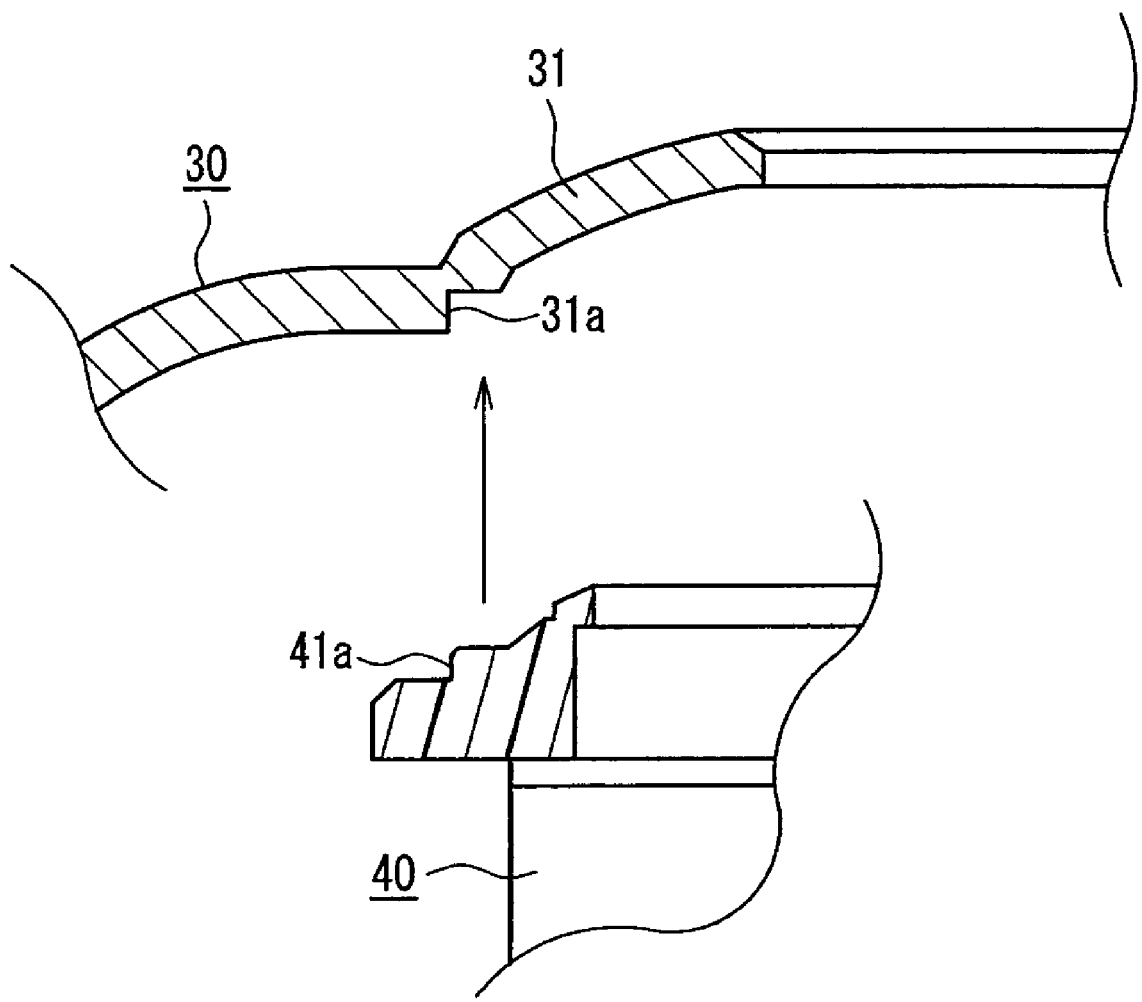
FIG. 3C is an enlarged cross-sectional view showing the front panel.

FIG. 3A is a perspective view showing the configuration of the front panel 30. FIG. 3A shows a state of the front panel 30, as viewed from its inside. FIG. 3B is a cross-sectional view taken along the arrows Z-Z in FIG. 3A. FIG. 3C is an enlarged cross-sectional view showing the portion Y in FIG. 3B. In FIG. 3C, the front panel 30 and the holding frame 40 are shown separately, in order to clearly illustrate their structures.

An opening 32 in the front panel 30 is formed for exposing to the outside a part of the image pickup portion, which will be described later, contained in the image pickup apparatus 1. The image pickup portion according to this embodiment includes a collapsible unit, so that the image pickup portion protrudes through the opening 32 when the power of the image pickup apparatus is turned on, or during shooting.

A cover portion 31 is a recessed portion (a protruding portion, when viewed from the surface side of the front panel 30) formed around the substantially circular opening 32. In addition, a wall 31a is formed at the boundary between the cover portion 31 and the inner surface (the second surface) of the front panel 30, as shown in FIG. 3C.

The wall 31a is formed substantially orthogonal to the inner surface of the front panel 30 (that is, surface extends substantially parallel to the optical axis). Further, the wall 31a is formed continuously along the outer periphery of the cover portion 31. When the holding frame 40 is attached to the front panel 30, a wall 41a comes in contact with the wall 31a, allowing the holding frame 40 to be positioned with respect to the front panel 30. Although the wall 31a is formed continuously along the outer periphery of the cover portion 31 in this embodiment, it also may be formed discontinuously. The wall 31a may be formed at an area where the wall 41a can be held such that at least the center of an opening 41 and the center of the opening 32 substantially coincide with each other.

The rib 36 is arranged standing substantially perpendicularly to the principal plane near the top of the front panel 30. Ribs 37 are arranged standing substantially perpendicularly to the principal plane near the bottom of the front panel 30. It should be noted that "principal plane" is the surface of the front panel 30 on which the opening 32 is formed and that faces the camera unit 50 when the front panel 30 is assembled to the camera unit 50.

A groove 33 is formed in the rib 36, and a projection 43 formed on the holding frame 40 is fitted to the groove 33. That is, when fixing the holding frame 40 to the front panel 30, the holding frame 40 possibly may rotate circumferentially if the positioning is performed only by bringing the wall 31a and the wall 41a into contact with each other. Therefore, according to this embodiment, by fitting the projection 43 to the groove 33 when fixing the holding frame 40 to the front panel 30, the positioning can be performed such that the holding frame 40 will not rotate circumferentially.

Holes 34 are formed in the rib 36, and projections 42 formed on the holding frame 40 are engaged with the holes 34. Holes 35 are formed in the ribs 37, and projections 44 formed on the holding frame 40 are engaged with the holes 35. That is, by engaging the projections 42 with the holes 34 and engaging the projections 44 with the holes 35, it is possible to fix the holding frame 40 to the front panel 30.

A recess 38 is formed on the rib 36. A hole 39 for auxiliary light is formed in the principal surface of the front panel 30.

Figure 4:
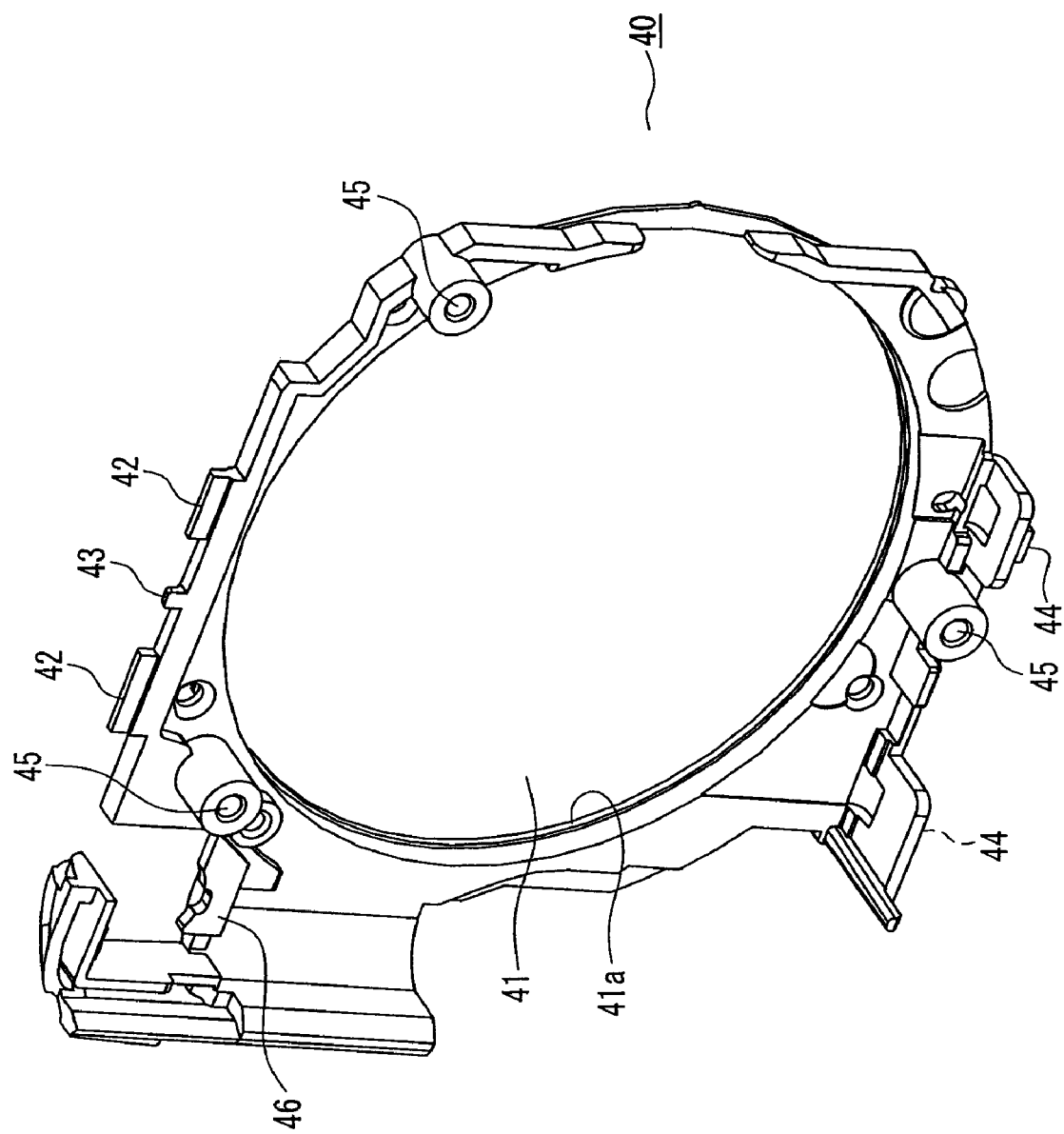
FIG. 4 is a perspective view showing the holding frame.

FIG. 4 is a perspective view showing the configuration of the holding frame 40. As shown in FIG. 4, the holding frame 40 includes the substantially circular opening 41 through which the image pickup portion is inserted, the wall 41a formed on the edge of the opening 41, the projections 42 engaged with the holes 34, the projection 43 fitted to the groove 33, the projections 44 engaged with the holes 35, three threaded holes 45 at which the image pickup portion is fixed with screws, and a pressing portion 46 that presses against the auxiliary light cover 60. The holding frame 40 may be produced by resin molding. The wall 41a corresponds to the outer surface of the portion that is formed along the edge of substantially the entire circumference of the opening 41 and is formed protruding from the holding frame 40 in the optical axis direction. It should be noted that the wall 41a also may be formed discontinuously along the edge of the opening 41.

Figure 6:
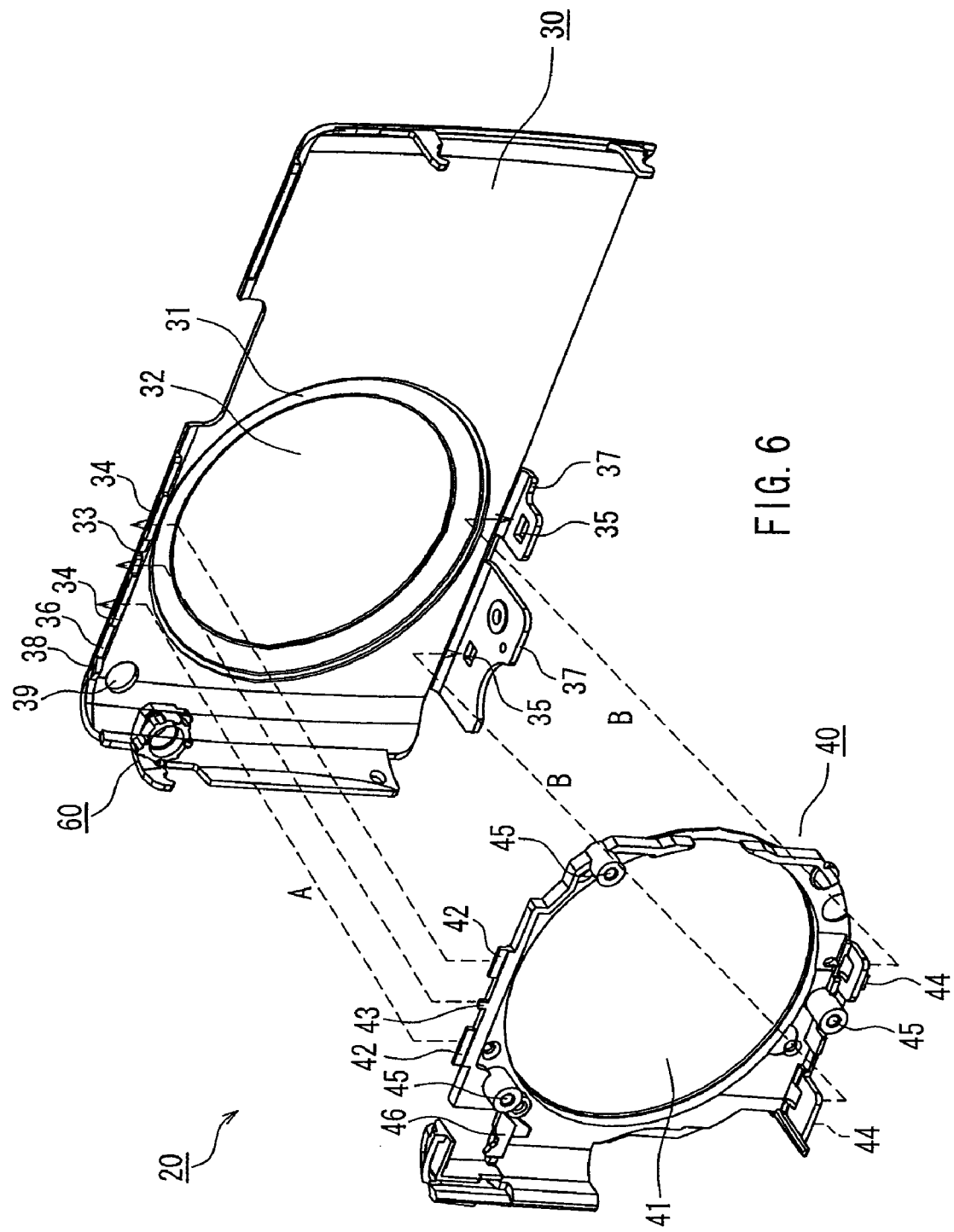
FIG. 6 is an exploded perspective view showing the front panel and the holding frame.

FIG. 6 is an exploded perspective view showing the configuration of the front unit 20.

In FIG. 6, the auxiliary light cover 60 is one of the components of the light-emitting portion 11 (see FIG. 1), and disposed on the optical axis of light emitted from the light-emitting diode (not shown) contained in the image pickup apparatus 1. The auxiliary light cover 60 includes a projection (not shown) formed on its top surface, and is positioned by fitting the projection to the recess 38 formed on the front panel 30. A portion of the auxiliary light cover 60 is fitted to the hole 39 formed in the front panel 30. When the holding frame 40 is attached to the front panel 30, the portion of the auxiliary light cover 60 that is in the vicinity of its bottom end is pressed by the pressing portion 46 formed on the holding frame 40. Thus, the auxiliary light cover 60 is positioned in the vicinity of its top end, and pressed and held in the vicinity of its bottom end.

[2-2. Configuration of Camera Unit 50]

Figure 8:
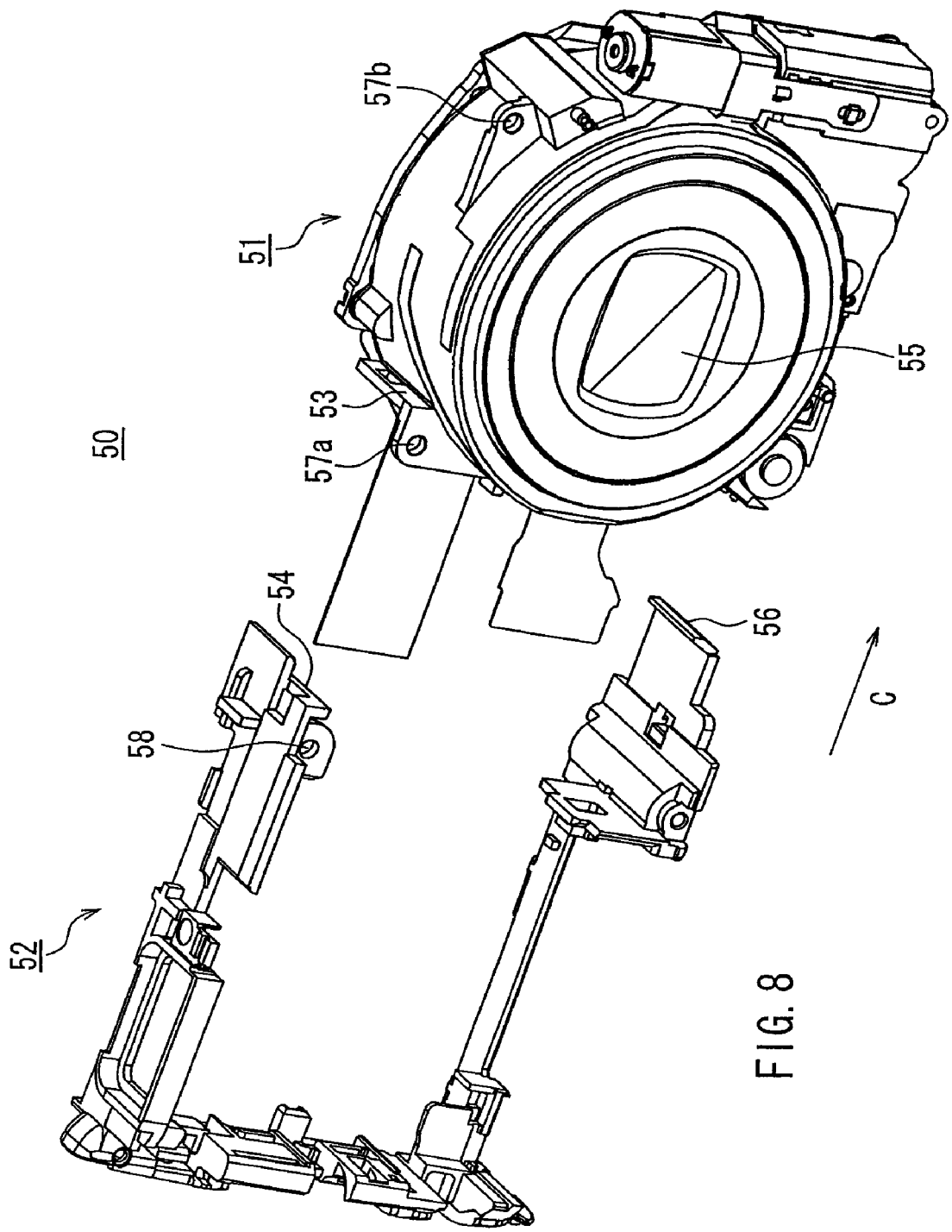
FIG. 8 is an exploded perspective view showing the image pickup portion and the frame.

FIG. 8 is an exploded perspective view showing the configuration of the camera unit 50. As shown in FIG. 8, the camera unit 50 is made up of the image pickup portion 51 and a frame 52.

The image pickup portion 51 contains a lens, an image pickup element and so on, and a lens barrel holding the lens is disposed movably (that is, collapsibly) in the optical axis direction. A lens barrier 55 capable of covering the lens by being operated to open or close is disposed on the front surface of the image pickup portion 51. The lens barrier 55 can be opened or closed electrically by turning the power of the image pickup apparatus on or off. On the surface of its case cylinder having a substantially cylindrical shape, the image pickup portion 51 also includes a flange in which holes 57a and 57b are formed. In this embodiment, holes are formed in three locations. On the case of the image pickup portion 51, an engaged portion 53 with which the frame 52 is engaged also is provided.

The frame 52 holds a circuit board, a battery unit and so on (not shown). Further, the frame 52 is provided with a hole 58. Disposed on an end of the frame 52 is an engaging portion 54 capable of engaging with the engaged portion 53 disposed on the image pickup portion 51. In this embodiment, the engaged portion 53 is constituted by a recess, and the engaging portion 54 is constituted by a claw, and they can be engaged with each other. Furthermore, an engaging portion 56 having substantially the same configuration as the engaging portion 54 is formed at a portion opposed to the engaging portion 54, and the engaging portion 56 can be engaged with an engaged portion (not shown) disposed at the lower end of the image pickup portion 51.

[3. Method for Assembling Image Pickup Apparatus 1]

Figure 5:
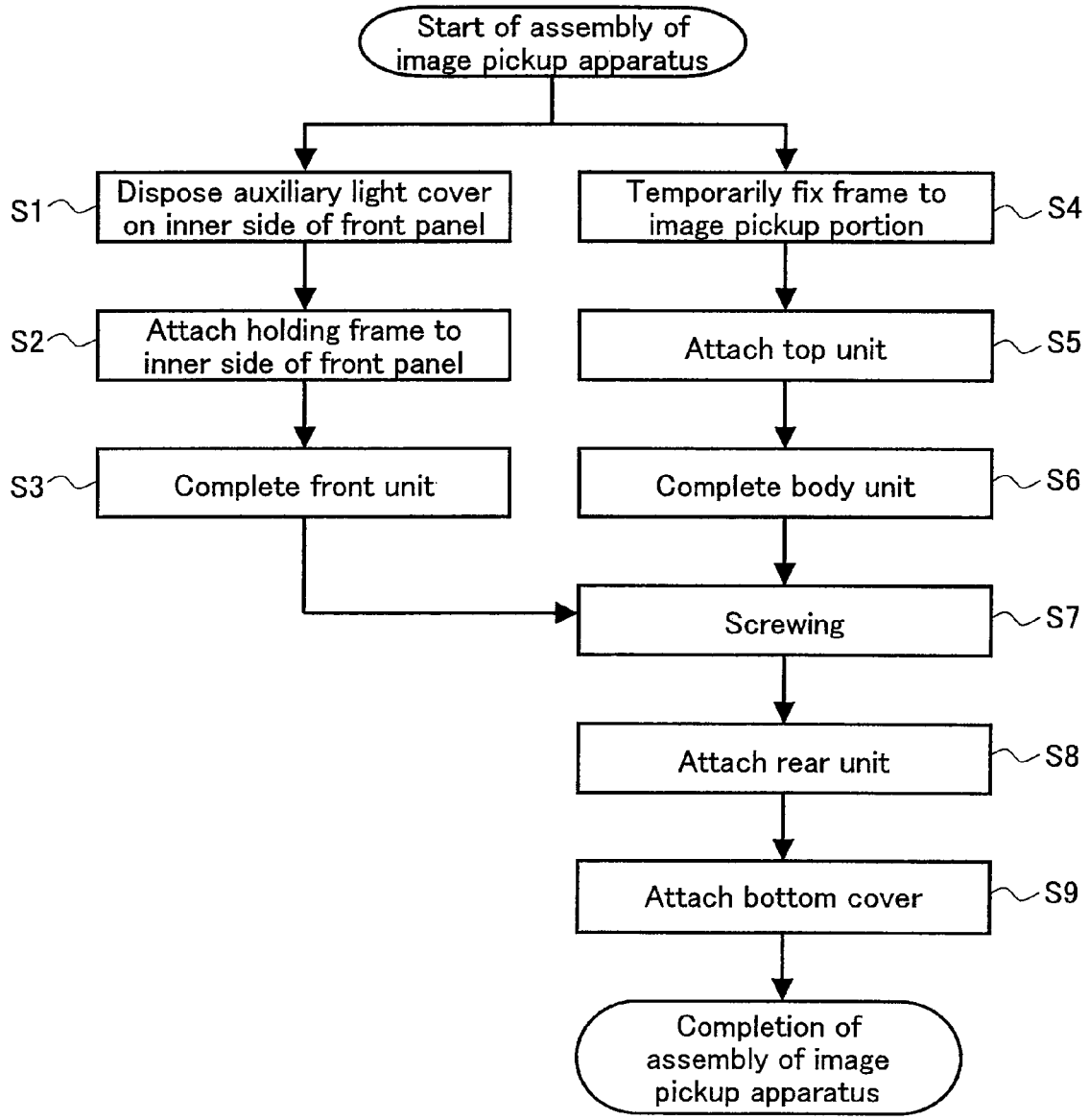
FIG. 5 is a flowchart illustrating the assembling process of the image pickup apparatus according to Embodiment 1.

FIG. 5 is a flowchart illustrating the assembling process of the image pickup apparatus 1.

The assembling process of the image pickup apparatus according to this embodiment is largely divided into the manufacture of the front unit, the manufacture of the body unit, and the assembly of these units. As shown in FIG. 5, the manufacture of the front unit (Steps S1 to S3) and the manufacture of the body unit (Steps S4 to S6) are separate operations. The methods for manufacturing the units are described below.

[3-1. Method for Manufacturing Front Unit]

First, the auxiliary light cover 60 is disposed on the inner side of the front panel 30 as shown in FIG. 6. At this time, the auxiliary light cover 60 is disposed such that its portion is fitted to the hole 39, and its projection is fitted to the recess 38 (Step S1 of FIG. 5).

Next, the holding frame 40 is attached to the front panel 30. For attachment, the upper portion of the holding frame 40 is moved in the direction indicated by the arrow A so that the projection 43 is fitted to the groove 33 to perform positioning, and the two projections 42 are engaged with the two holes 34. Thus, the upper portion of the holding frame 40 can be attached to the front panel 30.

Next, the lower portion of the holding frame 40 is moved in the direction indicated by the arrow B so that the two projections 44 are engaged with the two holes 35. Thus, the lower portion of the holding frame 40 can be attached to the front panel 30. Furthermore, as shown in FIGS. 3B and 3C, by disposing the wall 41a to be in contact with the wall 31a, the holding frame 40 can be disposed such that the center of the opening 32 and the center of the opening 41 coincide with each other. Thus, the holding frame 40 can be attached to the front panel 30 (Step S2 of FIG. 5). As described above, a double-faced tape, a screw and the like are not necessary for attaching the holding frame 40 to the front panel 30.

By disposing the wall 41a to be in contact with wall 31a when the holding frame 40 is attached to the front panel 30, the opening 32 of the front panel 30 and the opening 41 of the holding frame 40 are arranged such that they overlap on the optical axis of the lens. Accordingly, it is possible to center the holding frame 40 readily with respect to the front panel 30 by simply bringing the wall 31a and the wall 41a in contact with each other, so that it is possible to improve the ease of assembly.

Furthermore, the pressing portion 46 is configured to support the lower end of the auxiliary light cover 60 when the holding frame 40 is attached to the front panel 30. Accordingly, the auxiliary light cover 60 is held by being sandwiched by the pressing portion 46 and the rear surface of the front panel 30. Although not shown in the drawing, the upper end and the lower end of the auxiliary light cover 60 are held by the holding frame.

Figure 7:
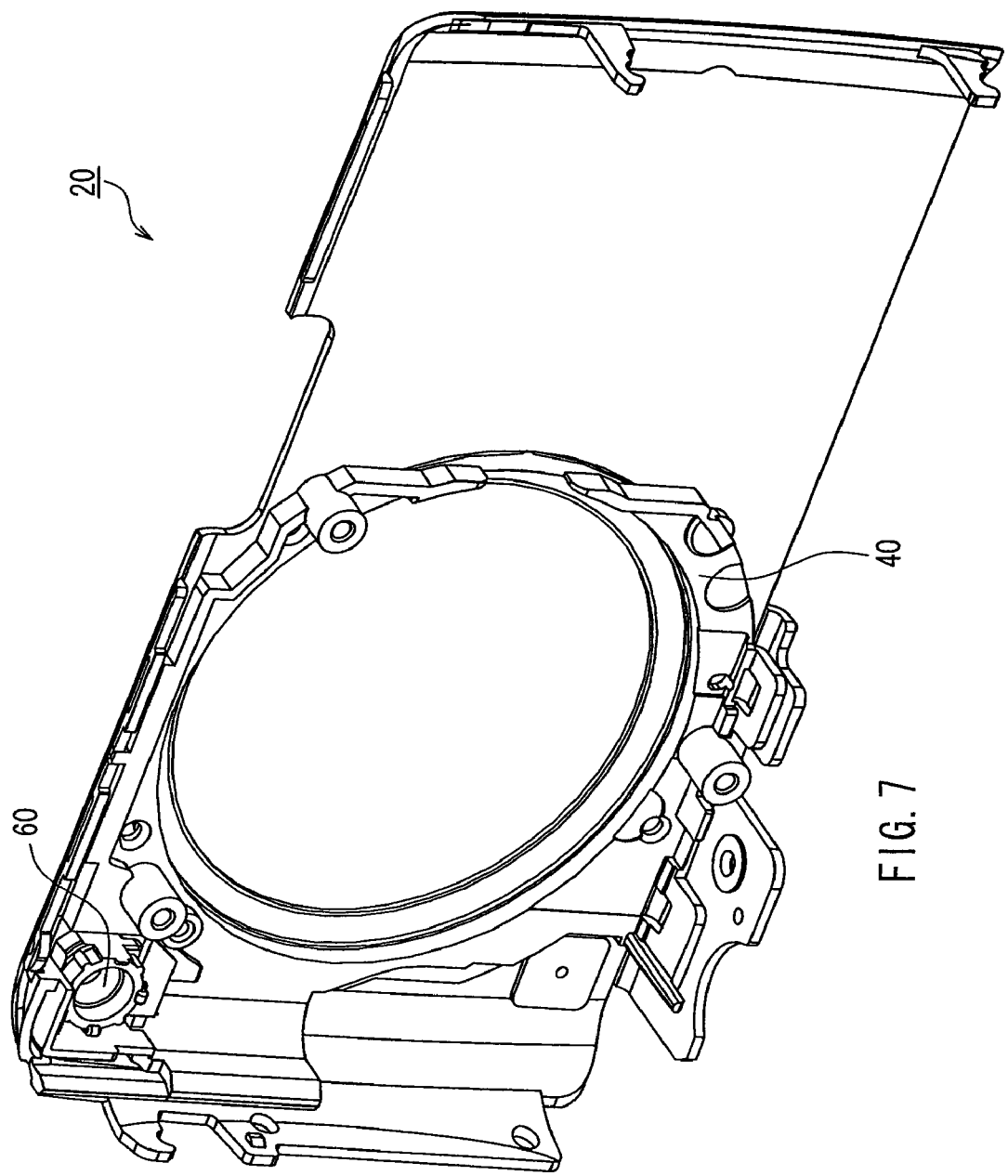
FIG. 7 is a perspective view showing the front panel to which the holding frame is attached.

The projections 44 are configured such that they can be deformed elastically. Accordingly, when engaging the projections 44 with the holes 35, the projections 44 slid on the ribs 37 while being elastically deformed, and elastically recover their own form in the holes 35, and thereby the projections 44 and the holes 35 can be engaged with each other. Accordingly, it is possible to improve the operability of assembly. The state after assembly is shown in FIG. 7 (Step S3 of FIG. 5).

In this embodiment, positioning is performed such that the center of the opening 32 and the center of the opening 41 coincide with each other by bringing the wall 31a into contact with the wall 41a, and the circumferential positioning of the holding frame 40 is performed by fitting the grooves 33 to the projections 43. However, the positioning may be performed only with the wall 31a and the wall 41a, or only with the grooves 33 and the projections 43.

[3-2. Method for Manufacturing Body Unit]

First, the frame 52 is attached to the image pickup portion 51 as shown in FIG. 8. Specifically, the frame 52 is moved in the direction indicated by the arrow C so that the engaging portion 54 disposed on the frame 52 is engaged with the engaged portion 53 disposed on the image pickup portion 51, and that the engaging portion 56 disposed on the frame 52 is engaged with the engaged portion (not shown) disposed on the lower end of the image pickup portion 51. Thus, the frame 52 temporarily can be fixed to the image pickup portion 51. When the image pickup portion 51 is fixed temporarily to the frame 52, the hole 57a and the hole 58 are arranged such that they overlap each other (Step S4 of FIG. 5).

Figure 9:
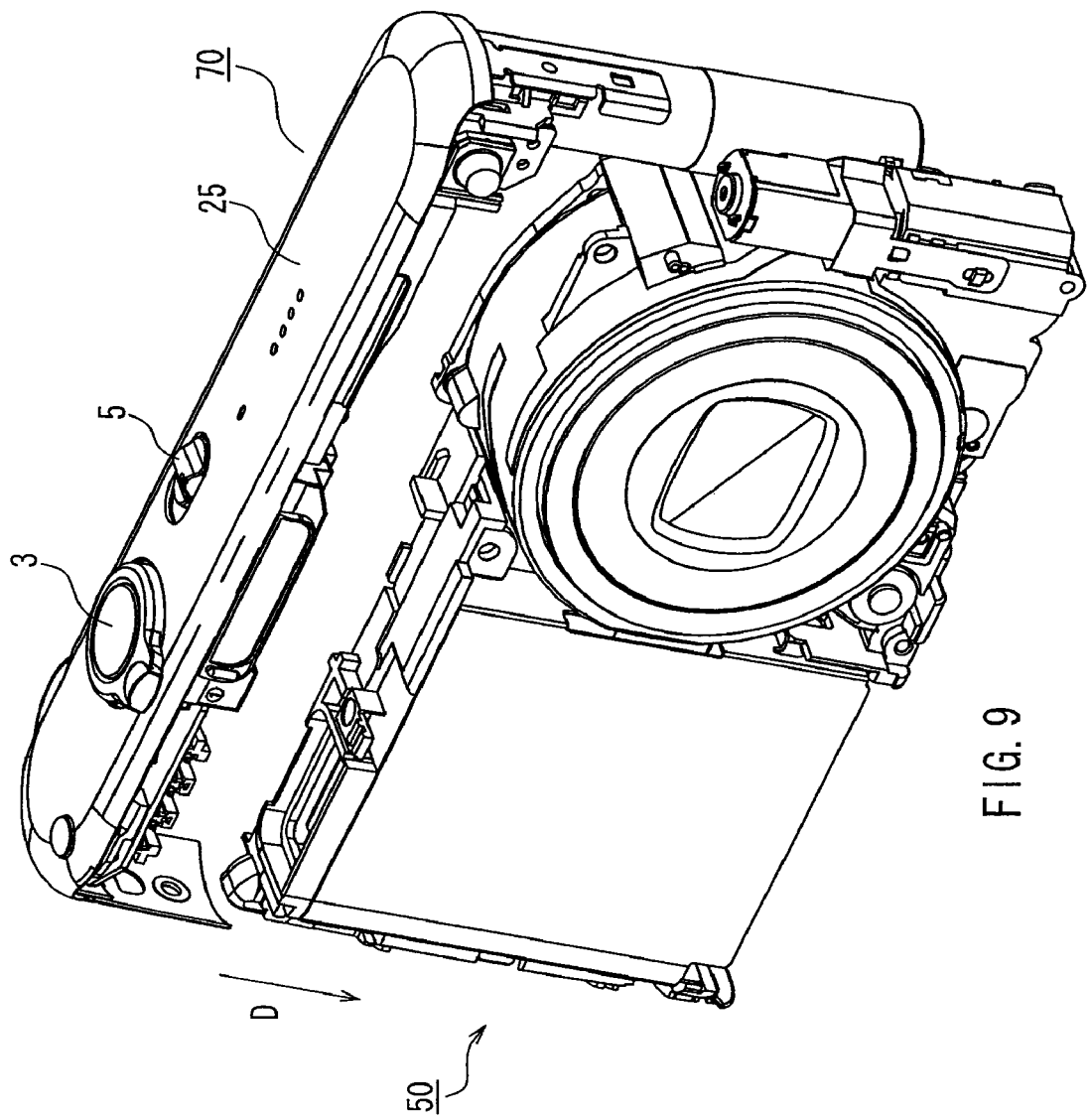
FIG. 9 is an exploded perspective view showing the body unit.
Figure 10:
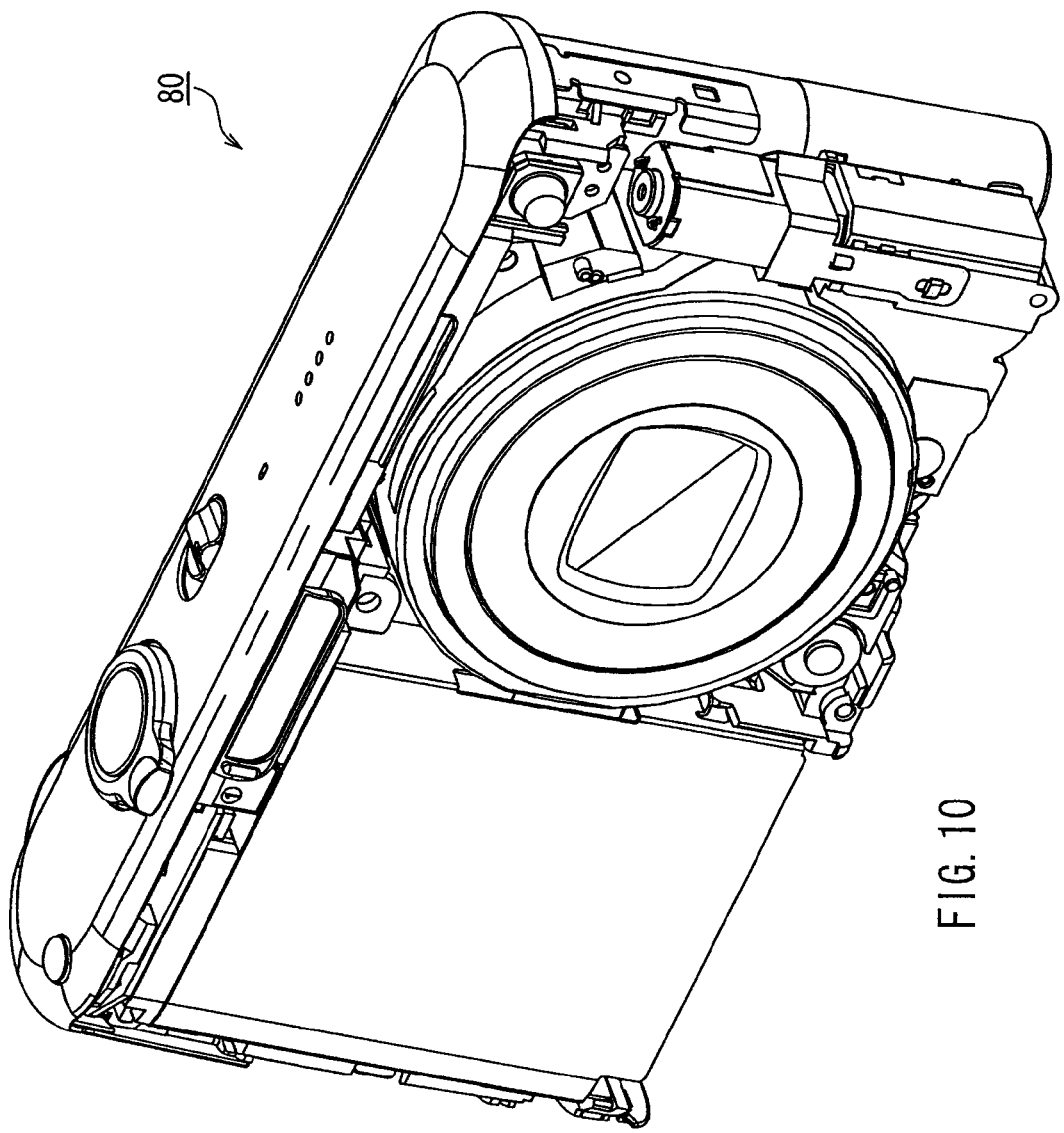
FIG. 10 is a perspective view showing the body unit.

Next, as shown in FIG. 9, the top unit 70 on which the top cover 25, the release switch 3, the power switch 5 and so on are arranged is moved in the direction indicated by the arrow D, and attached and temporarily fixed to the camera unit 50 (Step S5 of FIG. 5). Thus, a body unit 80 is completed as shown in FIG. 10 (Step S6 of FIG. 5).

[3-3. Method for Assembling Units]

Figure 11:
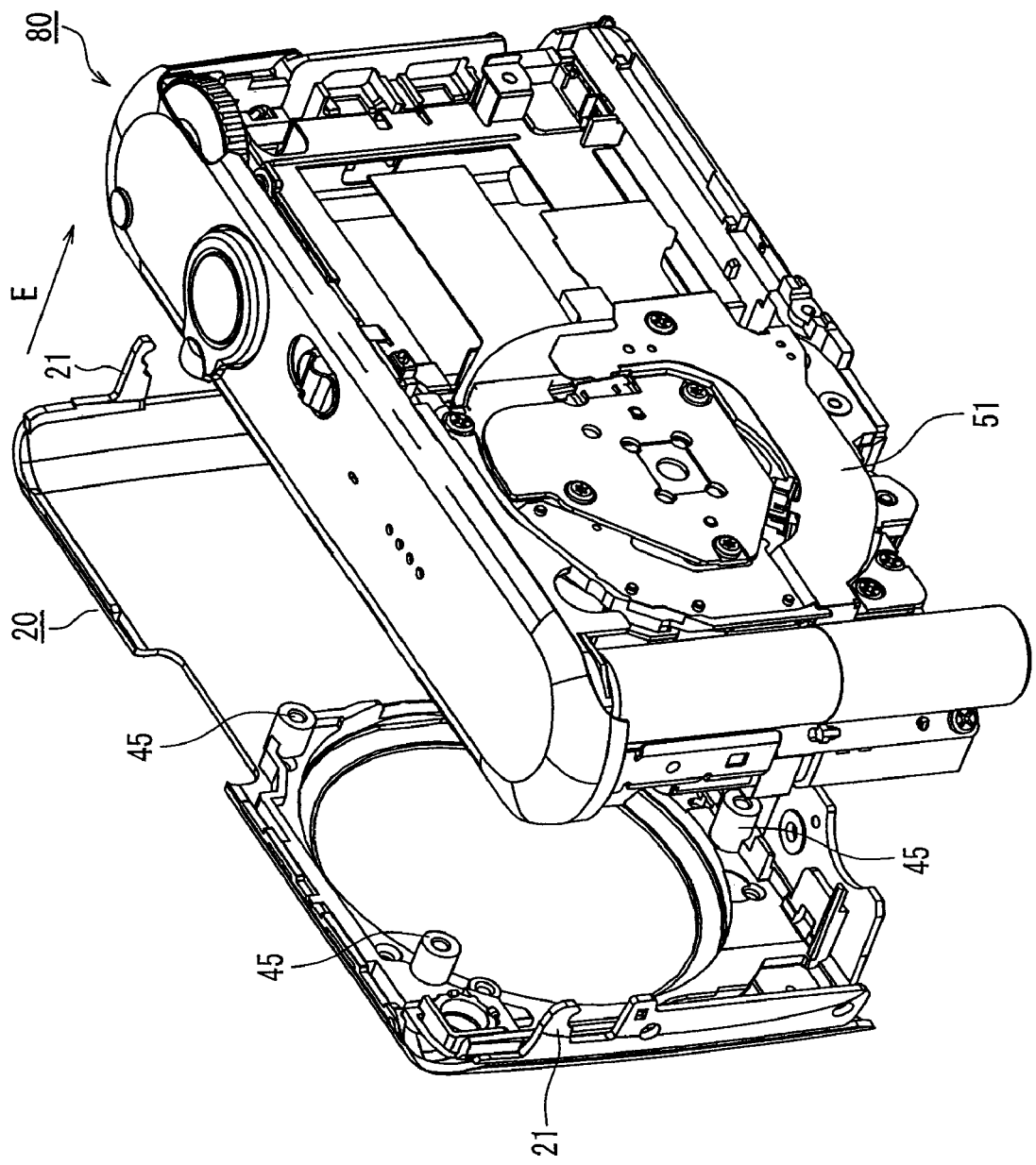
FIG. 11 is an exploded perspective view showing the body unit and the front unit.

Next, the body unit 80 (completed in Step S6 of FIG. 5) is attached to the front unit 20 (completed in Step S3 of FIG. 5) as shown in FIG. 11. At this time, by engaging claws 21 arranged at both ends of the front unit 20 with engaged portions (not shown) of the body unit 80, the body unit 80 and the front panel 20 temporarily can be fixed to each other. The state in which the body unit 80 temporarily is fixed to the front unit 20 is shown in FIG. 12.

Figure 12:
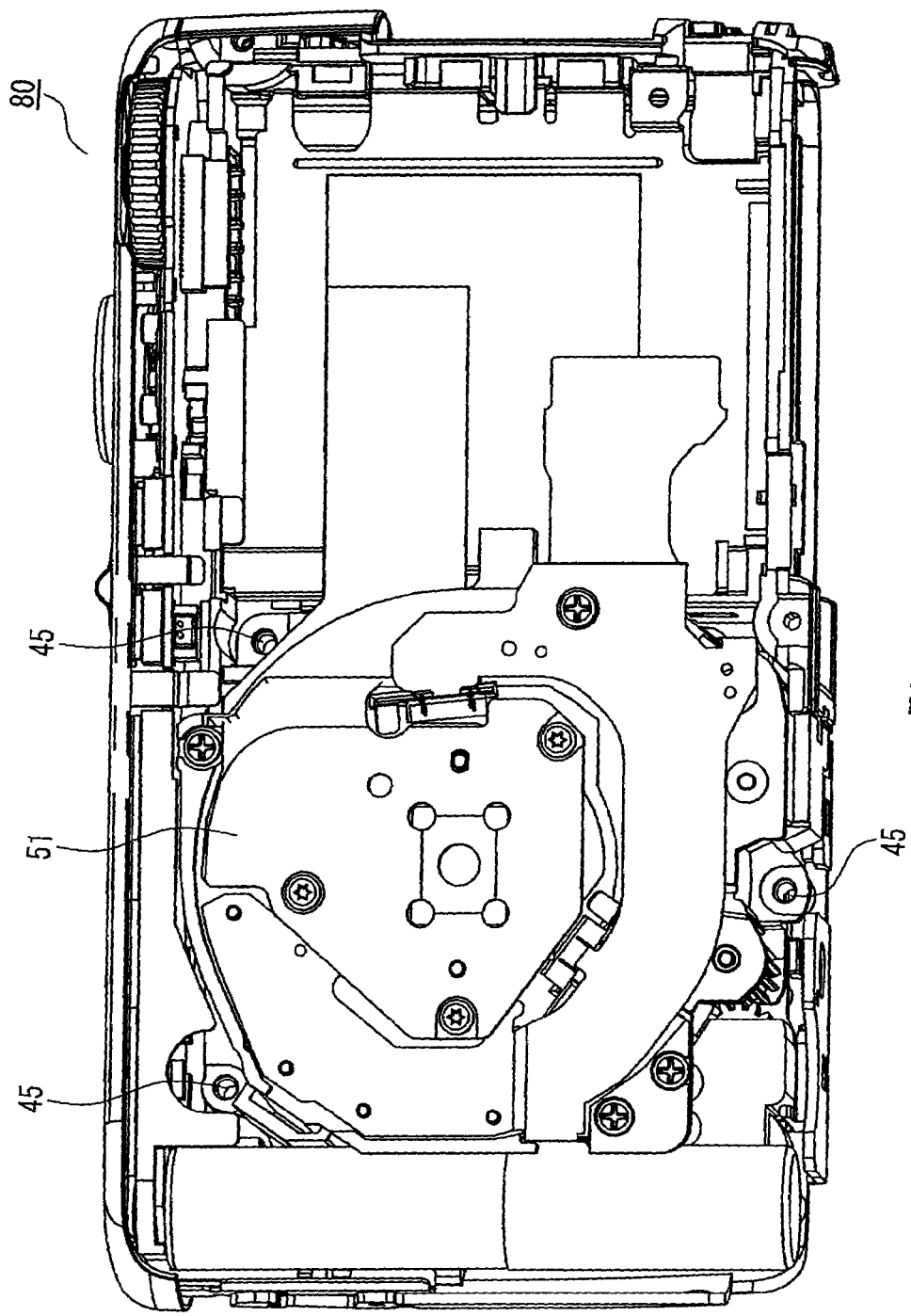
FIG. 12 is a top view showing the body unit.
Figure 13:
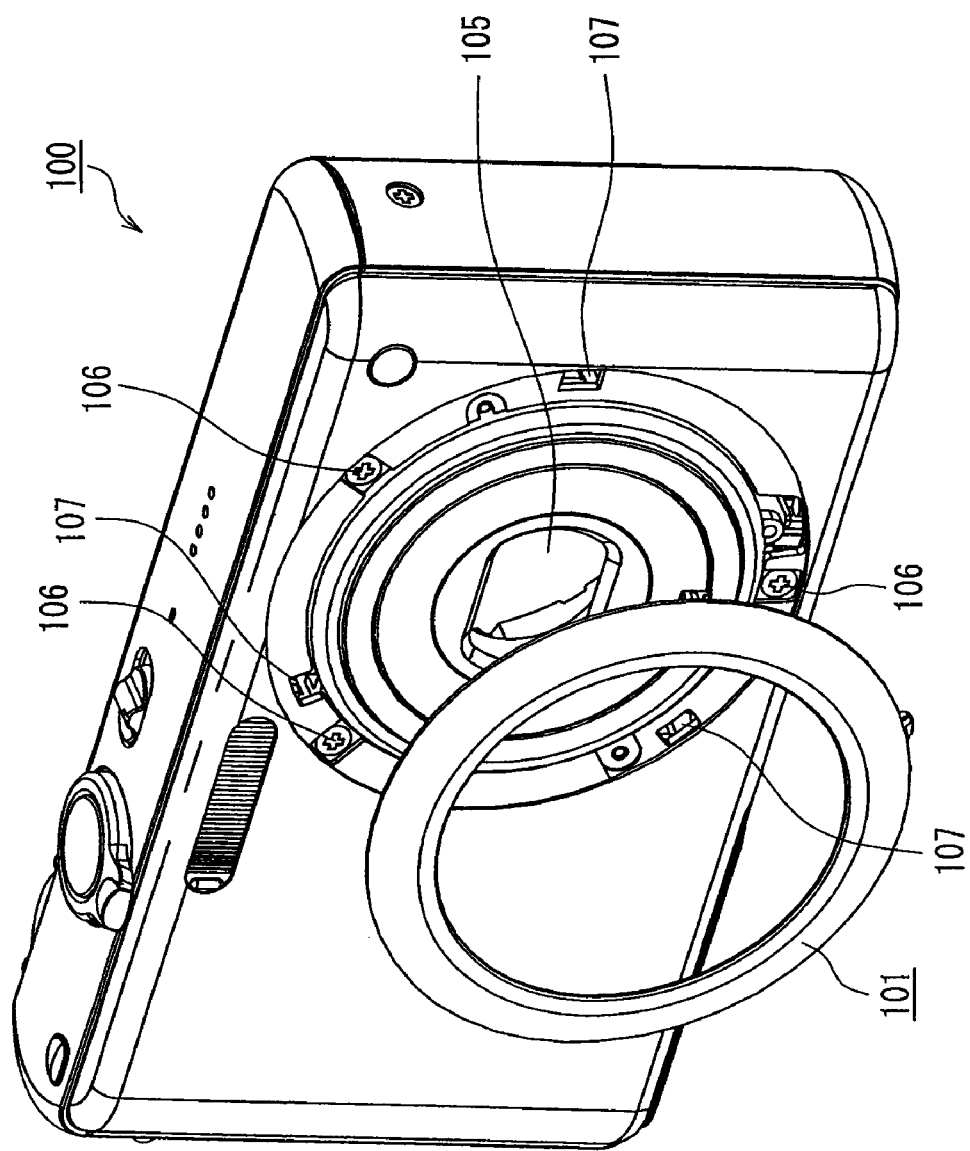
FIG. 13 is an exploded perspective view showing a conventional image pickup apparatus.
Figure 14:
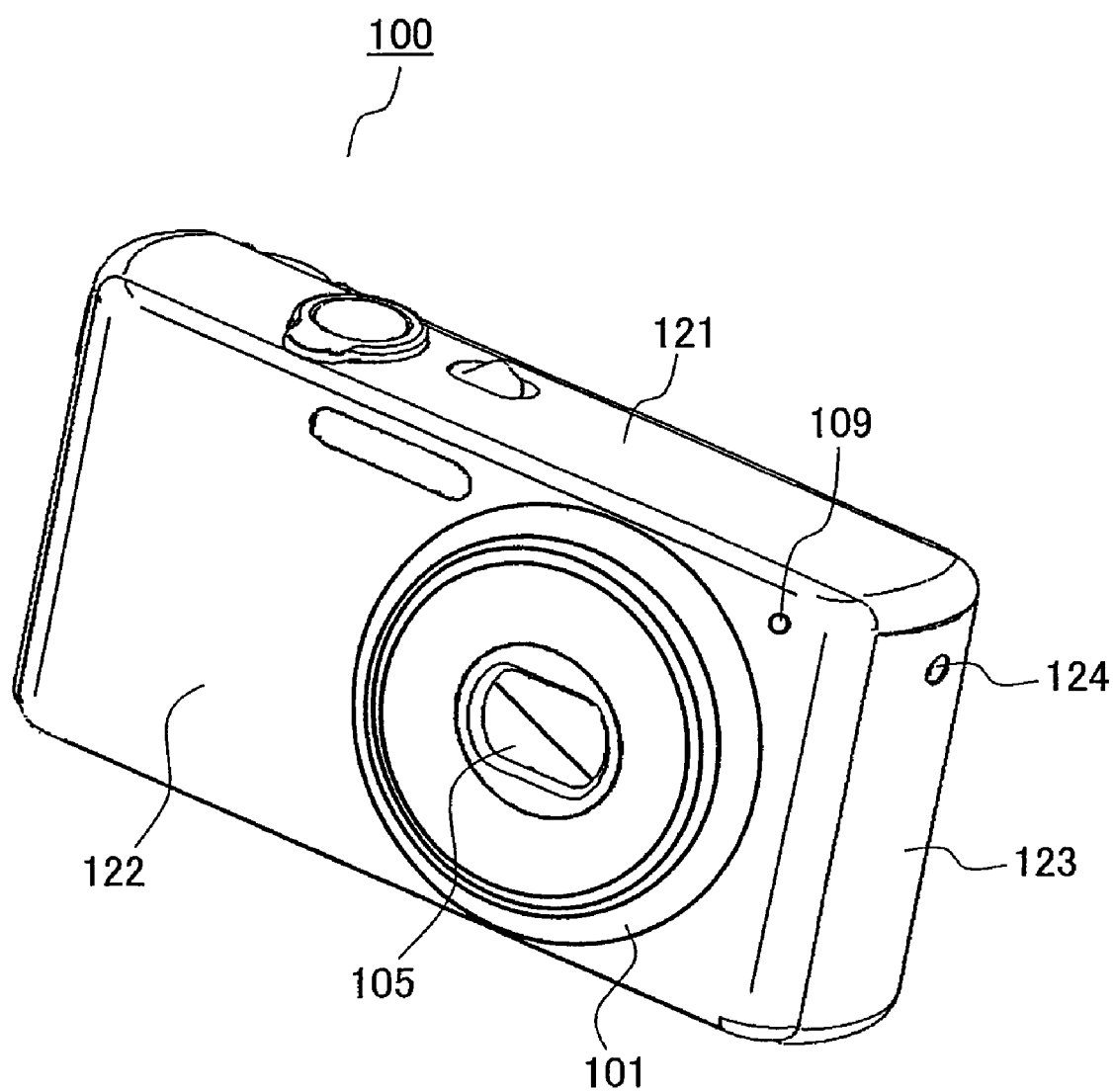
FIG. 14 is a perspective view showing the conventional image pickup apparatus.
Figure 15:
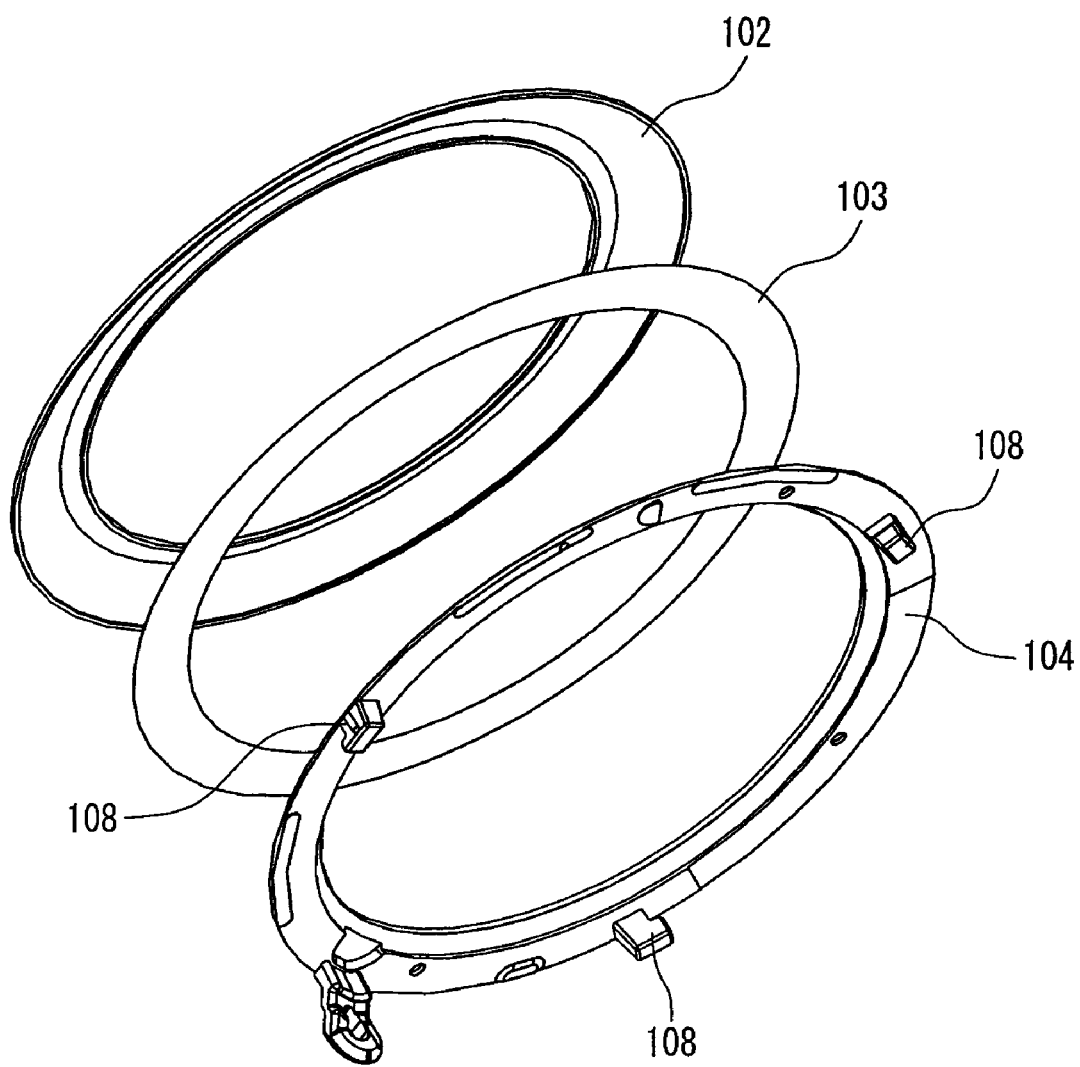
FIG. 15 is an exploded perspective view showing a conventional trim ring
Figure 16:
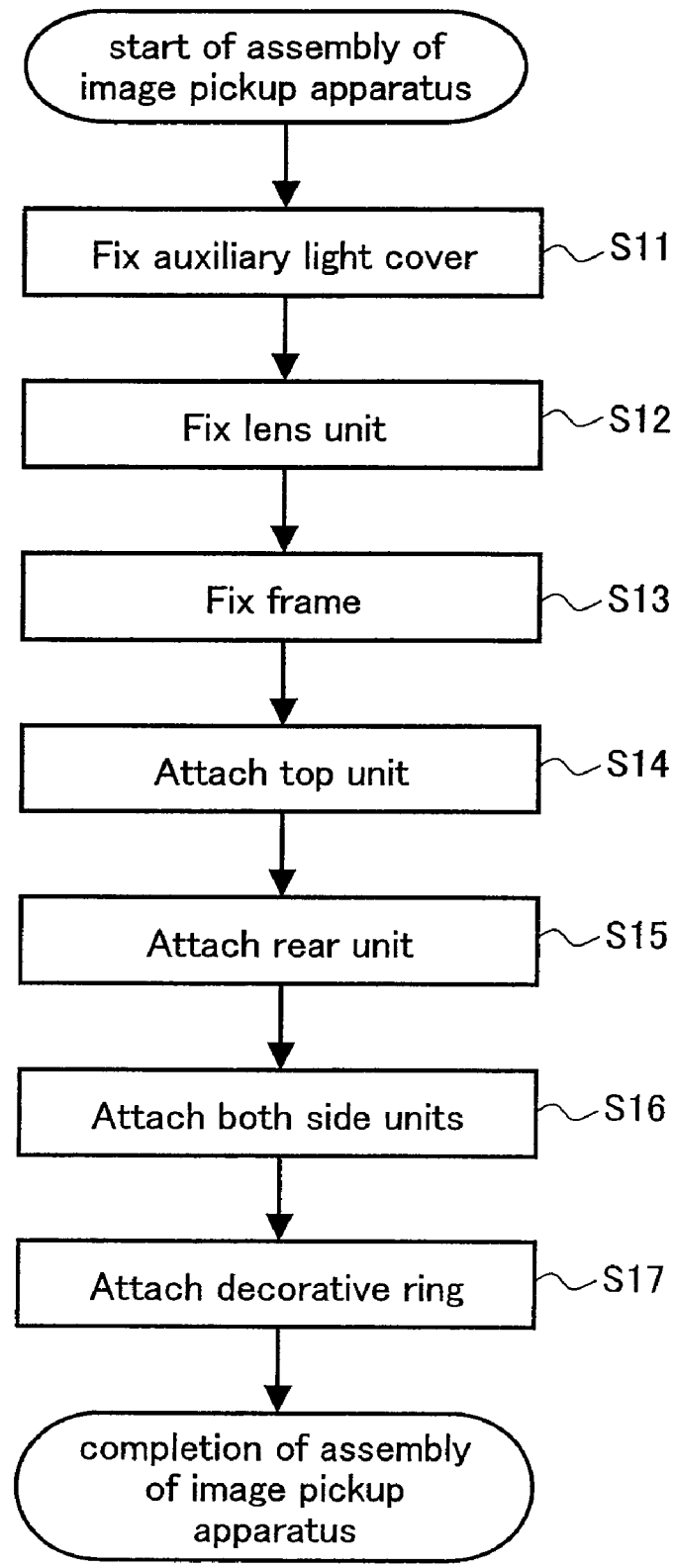
FIG. 16 is a flowchart illustrating the assembling process of the conventional image pickup apparatus.

FIG. 12 shows the configuration of the body unit 80 to which the front unit 20 temporarily is fixed, as viewed from its rear surface side. In FIG. 12, screws can be screwed into the threaded holes 45 provided in three locations on the periphery of the image pickup portion 51, from the rear surface side of the body unit 80 (the direction of the paper surface in FIG. 12). At this time, the screws are screwed into the threaded holes 45 after being inserted through the holes 57a and 57b (one more hole is formed, but not shown in the drawing) of the image pickup portion 51, and the hole 58 of the frame 52. Thus, the body unit 80 and the front unit 20 can be fixed completely (Step S7 of FIG. 5).

Next, a rear unit (the unit including the rear cover 27 shown in FIG. 2) on which the display portion such as a liquid crystal display is mounted, and the side covers 28 are attached to the body unit 80, and fixed with the screw 29 (Step S8 of FIG. 5).

Next, a bottom cover (not shown) is attached to the bottom surface of the body unit 80, and fixed with a screw (Step S9 of FIG. 5).

By performing assembly as described above, an image pickup apparatus as shown in FIGS. 1 and 2 is completed.

[4. Effects of the Embodiment and Further Considerations]

As described above, according to this embodiment, the cover portion 31 is formed integrally with the front panel 30, so that it is possible to reduce the number of components and the number of assembling steps. Specifically, since components, such as a cover ring and a double-faced tape, that have been required conventionally, are not necessary, it is possible to reduce the number of components, and to eliminate the need for the step of attaching the double-faced tape, and the step of attaching the cover ring to the front panel.

Since all the components and units contained in the image pickup apparatus can be assembled on the inner side of the front panel 30, it is possible to simplify the assembly. That is, conventionally, an image pickup unit is fixed temporarily to the inner side of the front panel, and then fixed with screws from the outside of the front unit, so that it is necessary to perform a step of reversing the front panel upside down in the manufacturing process. The assembling process according to the present invention does not require the reversing step, since there are no components or units on the surface side of the front panel 30 that are to be accessed and assembled.

Furthermore, the auxiliary light cover 60 is pressed and held by the pressing portion 46 of the holding frame 40 when fixing the holding frame 40 to the front panel 30, so that no special configuration is required for fixing the auxiliary light cover 60 to the front panel 30. Although the auxiliary light cover conventionally has been fixed with an adhesive, the configuration according to this embodiment does not require use of an adhesive, so that it is possible to reduce the cost, and to simplify the assembly.

Since the image pickup portion 51 is fixed temporarily to the frame 52, and then finally fixed with the screws, it is possible to improve the ease of assembly.

Moreover, the holding frame 40 is fixed to the front panel 30 by engagement between the projections and the holes, so that it is not necessary to use an adhesive or the like, thus realizing the image pickup apparatus at low cost. Since the engagement portion between the projections and the hole is concealed by the top cover 25, it is possible to improve the quality of the apparatus.

Since the assembling operation of the front unit 20 (Steps S1 to S3 of FIG. 5) and the assembling operation of the body unit 80 (Steps S4 to S6 of FIG. 5) are separate operations, it is possible to perform manufacturing control easily. That is, in the case of image pickup apparatuses of the same model where there are several different body designs (e.g., colors and patterns), demand often varies from one body design to another. With a conventional manufacturing process that is continuously operated from the beginning of assembly through to completion, it is necessary to perform mass production while monitoring the supply-demand balance for each body design, so that it is difficult to perform manufacturing control. When manufacturing control is not performed appropriately, there may be a larger stock of image pickup apparatuses with a particular design. To prevent this, it is possible to start the manufacturing process of the image pickup apparatuses from the start after receiving an order. However, with such a solution, it is not possible to respond to orders promptly.

On the other hand, according to this embodiment, it is possible to produce the body unit 80 according to common specifications regardless of the body design, and to provide several different designs for the front cover 26 and the rear cover 27. In the case of manufacturing such image pickup apparatuses, it is possible to mass produce the body units 80 in advance, and to assemble the front units and the rear units according to an order for each body design. Accordingly, it is possible to reduce waste of supply, and to respond to orders promptly.

The image pickup apparatus of the present invention is useful for a digital still camera, a video camera, a silver halide camera, a camera-equipped portable terminal, and the like.

[Appendix 1]

The present image pickup apparatus comprises: a casing; and an image pickup portion comprising a lens and an image pickup element, and contained in the casing, so that a portion of the image pickup portion is exposed from a first surface of a panel constituting the casing, wherein a holding frame is disposed on a second surface, which is the rear surface of the first surface of the panel, the holding frame being fixed to a third surface of the panel adjacent to the second surface, and the image pickup portion is held by the holding frame.

[Appendix 2]

According to the image pickup apparatus of the present invention, the holding frame may include a projection capable of being engaged with a recess formed on the third surface. This configuration eliminates the need for an adhesive or the like, thus making it possible to realize cost reduction.

[Appendix 3]

According to the image pickup apparatus of the present invention, a cover portion covering the periphery of the image pickup portion and protruding in an optical axis direction may be provided integrally with the panel on the first surface of the panel. With this configuration, it is possible to realize cost reduction by reducing the number of components, and to simplify the assembling process.

[Appendix 4]

The image pickup apparatus of the present invention may further include: a light-emitting member that is disposed in the casing, and that emits light in a direction of the optical axis of the lens; and an auxiliary light cover disposed on the optical axis of the light-emitting member, wherein the auxiliary light cover is sandwiched by the second surface and the holding frame. With this configuration, no special configuration is required for fixing the auxiliary light cover, making it possible to realize cost reduction and to simplify the assembling process.

[Appendix 5]

According to the image pickup apparatus of the present invention, the image pickup portion may be fixed with screws from the second surface side of the panel. This configuration enables all the components contained in the apparatus to be assembled from the second surface side, thus simplifying the assembly.

[Appendix 6]

The image pickup apparatus, of the present invention further may include a top cover capable of covering at least a fourth surface, which is the rear surface of the third surface. With this configuration, the engagement portion between the recess and the projection can be concealed, so that it is possible to improve the quality of the apparatus.

[Appendix 7]

A method for assembling an image pickup apparatus according to the present invention is a method for assembling an image pickup apparatus that comprises a casing and an image pickup portion comprising a lens and an image pickup element is contained in a casing, and a portion of the image pickup portion is exposed on a first surface of a panel constituting the casing, the apparatus including: a holding frame disposed on a second surface, which is the rear surface of the first surface of the panel, wherein the image pickup portion is held by the holding frame, and the holding frame is fixed to a third surface adjacent to the second surface, the method including the steps of (A) preparing a front panel on which at least the image pickup portion is exposed, a rear panel disposed facing the front panel, and a top panel including a release switch, and fixing the top panel to the image pickup portion; (B) fixing the holding frame to the front panel; and (C) fixing the front panel and the rear panel assembled in step (B) to a unit assembled in step (A).

According to this assembling method, by assembling a large quantity of units in step (A), it is possible to assemble the front unit and the rear unit according to an order for each body design. Accordingly, it is possible to reduce waste of supply and to respond to orders promptly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image pickup apparatus comprising:
   a casing;
   an image pickup portion that comprises a lens and an image pickup element and is contained in the casing;
   a panel that constitutes the casing and has a first opening through which a portion of the image pickup portion can be exposed; and a holding frame that holds the image pickup portion and is disposed on a second surface that is a rear surface of a first surface of the panel on which a portion of the image pickup portion is exposed, wherein a first wall is formed on an edge of the first opening of the panel, the holding frame has a second opening through which the image pickup portion is inserted, a second wall is formed on an edge of the second opening of the holding frame, and when the holding frame is fixed to a third surface adjacent to the second surface of the panel, a center of the first opening substantially coincides with a center of the second opening, and the first wall comes into contact with the second wall.

2. The image pickup apparatus according to claim 1, wherein the holding frame comprises a projection capable of being engaged with a recess formed on the third surface.

3. The image pickup apparatus according to claim 1, further comprising:

a light-emitting member that is disposed in the casing, and that emits light in a direction of the optical axis of the lens; and an auxiliary light cover disposed on the optical axis of the light-emitting member, wherein the auxiliary light cover is sandwiched by the second surface and the holding frame.

4. The image pickup apparatus according to claim 2, wherein the image pickup portion is fixed with screws from the second surface side of the panel.

5. The image pickup apparatus according to claim 1, wherein a cover portion covering the periphery of the image pickup portion and protruding in an optical axis direction is provided integrally with the panel on the first surface of the panel.

6. The image pickup apparatus according to claim 1, further comprising a top cover capable of covering at least a fourth surface, which is the rear surface of the third surface.

7. The image pickup apparatus according to claim 1, wherein the first opening and the second opening are substantially circular in shape.

8. A method for assembling an image pickup apparatus that comprises:

a casing;

an image pickup portion that comprises a lens and an image pickup element and is contained in the casing;

a panel that constitutes the casing and has a first opening through which a portion of the image pickup portion can be exposed; and a holding frame that holds the image pickup portion and is disposed on a second surface that is a rear surface of a first surface of the panel on which a portion of the image pickup portion is exposed, wherein a first wall is formed on an edge of the first opening of the panel, the holding frame has a second opening through which the image pickup portion is inserted, a second wall is formed on an edge of the second opening of the holding frame, and when the holding frame is fixed to a third surface adjacent to the second surface of the panel, a center of the first opening substantially coincides with a center of the second opening, and the first wall comes into contact with the second wall, the method comprising the steps of:

(A) preparing a front panel on which at least the image pickup portion is exposed, a rear panel disposed facing the front panel, and a top panel comprising a release switch, and fixing the top panel to the image pickup portion;

(B) fixing the holding frame to the front panel; and (C) fixing the front panel and the rear panel assembled in step (B) to a unit assembled in step (A).

* * * * *